United States Patent
Castleberry

(10) Patent No.: US 6,481,339 B1
(45) Date of Patent: Nov. 19, 2002

(54) COFFEE BREWER

(75) Inventor: Billy J. Castleberry, Lubbock, TX (US)

(73) Assignee: Newco Enterprises, Inc., St. Charles, MO (US)

( * ) Notice: Subject to any disclaimer, the term of this patent is extended or adjusted under 35 U.S.C. 154(b) by 0 days.

(21) Appl. No.: 09/694,427

(22) Filed: Oct. 23, 2000

Related U.S. Application Data

(60) Provisional application No. 60/161,592, filed on Oct. 26, 1999.

(51) Int. Cl.[7] .................................................. A47J 31/00
(52) U.S. Cl. ............................. 99/305; 99/300; 99/304; 99/306
(58) Field of Search ........................... 99/304, 305, 306, 99/307, 300, 279

(56) References Cited

U.S. PATENT DOCUMENTS

| | | | | |
|---|---|---|---|---|
| 3,771,432 A | * | 11/1973 | Karlen | 99/304 |
| 3,958,502 A | * | 5/1976 | Vitous | 99/304 X |
| 4,094,233 A | * | 6/1978 | Martin | 99/305 |
| 4,464,981 A | * | 8/1984 | Stover | 99/305 X |
| 4,829,888 A | | 5/1989 | Webster et al. | |
| 4,892,031 A | | 1/1990 | Webster et al. | |
| 5,285,718 A | | 2/1994 | Webster et al. | |

* cited by examiner

Primary Examiner—Reginald L. Alexander
(74) Attorney, Agent, or Firm—Paul M. Denk

(57) ABSTRACT

The reservoir of an automatic coffee brewer is closed except to a siphon tube, and a vent connected to two ball valves. One ball valve closes when the water level floats the ball. The other ball valve opens when the reservoir pressure approaches an unsafe level.

4 Claims, 3 Drawing Sheets

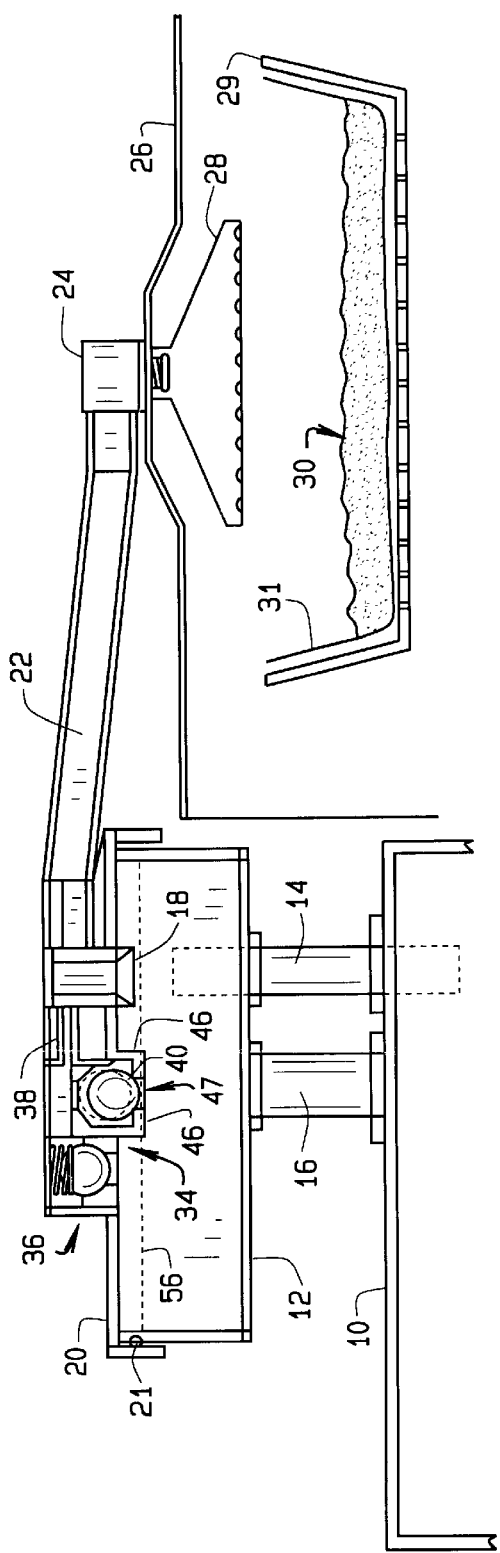
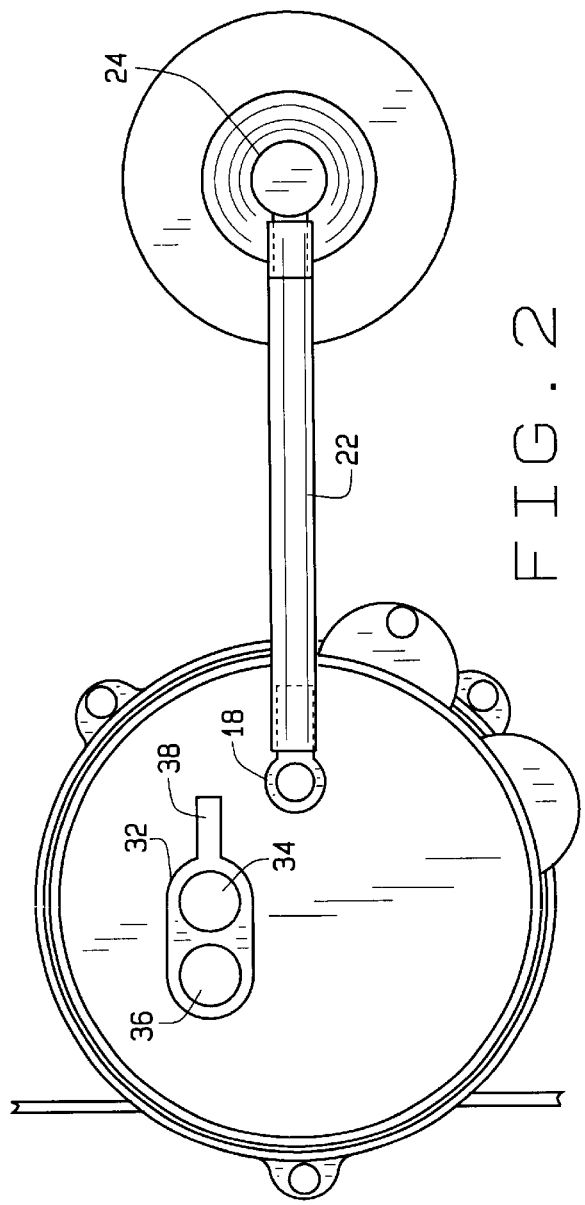

COFFEE BREWER

CROSS-REFERENCE TO RELATED APPLICATION

This application is a non-provisional patent application based upon provisional patent application having Ser. No. 60/161,592, filed on Oct. 26, 1999, which is owned by the same inventor.

BACKGROUND OF THE INVENTION

1. Field of the Invention

This Invention relates to minimum height automatic coffee brewers. Coffee brewers are found in small and medium sized cafes and many office "coffee rooms". It is desired that the brewer have a minimum height so that it will fit on counters under cabinets, while maintaining a source of hot water at a consistent temperature. Clerks in offices and waiters in cafes have ordinary skill in the art.

2. Description of the Related Art

Before this invention automatic coffee brewers or makers were in use. Basically, the coffee maker would have a reservoir of heated water. The reservoir would be maintained at a set level of water. The reservoir would be kept heated by a thermostatic control near the top of the water. The heat would be provided by an electric heating coil at the bottom of the reservoir.

Typically, the reservoir would hold one gallon of water. When coffee is to be brewed, ground coffee is placed in a basket and water is added to the reservoir at a controlled rate. As the water level in the reservoir reached a siphon tube, the tube siphons the heated water out of the reservoir and onto the coffee in the basket.

SUMMARY OF THE INVENTION

Progressive Contribution to the Art

This invention provides means for siphoning the water with a minimum of head room. The mechanism by which the siphon is located results in minimum vertical height of the complete unit.

For minimum head room the siphon must be very close to the top of the reservoir. To start the siphon the water level must reach a high point on the siphon tube.

The reservoir must have a drain to prevent excessive pressure in the reservoir. If the drain is above the top of the reservoir, the total height of the reservoir is reduced because of the limited head room. If the drain is below the top of the reservoir, the siphon tube must be lowered so the water might rise over the level which starts the siphon.

This invention solves this problem by providing two valves in the top of the reservoir as described in the following specifications.

OBJECTS OF THE INVENTION

An object of this Invention is to provide a coffee brewer having a minimum height.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require skilled people to install, operate, and maintain.

The specific nature of the invention, as well as other objects, uses, and advantages thereof, will clearly appear from the following description and from the accompanying drawings, the different views of which are not necessarily scale drawings.

BRIEF DESCRIPTIONS OF THE DRAWINGS

In the accompanying drawings, which form part of the specification and wherein like numerals and letters refer to the like parts wherever, they occur:

FIG. 1 is a vertical sectional view of the preferred embodiment attached at the top to the underside of a shelf or other structural support.

FIG. 2 is a top plan view of the preferred embodiment.

Corresponding reference numerals will be used throughout the several figures of the drawings.

DETAILED DESCRIPTION OF THE PREFERRED EMBODIMENT

Figure 3:
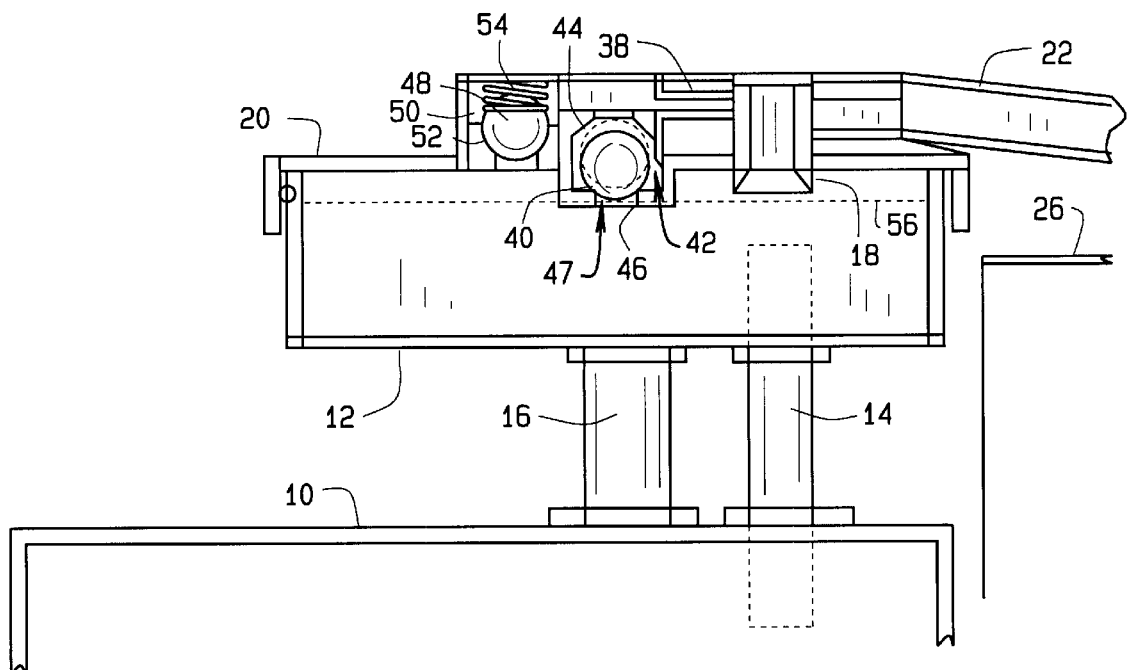
FIG. 3 is an expanded view of the left-hand portion of FIG. 1, to allow for closer examination of the details of the preferred embodiment.

Referring to the drawings, FIGS. 1 and 2 show the top portion of a sealed, primary reservoir 10. A flat, cylindrical supplemental reservoir 12 with a flat, flanged lid 20 is mounted above the primary reservoir 10 to the bottom of a shelf or other overhanging support structure 13. An O-ring gasket 21 is compressed between the inner surface of the flanged rim of the lid 20 and the outer surface of the supplemental reservoir 12 to create an air-tight seal in the supplemental reservoir 12. A circulation tube 14 and an outlet tube 16 both run between and penetrate the primary reservoir 10 and the supplemental reservoir 12. The circulation tube 14 penetrates the base of the supplemental reservoir 12 and extends to a height somewhat below the lid 20. Similarly, the circulation tube 14 penetrates approximately one half inch through the top of the primary reservoir 10.

An open spout 18 penetrates the lid 20. The bottom of the spout 18 extends a short distance into the supplemental reservoir 12. The top of the spout 18 extends vertically a short distance above the lid 20 where it forms a ninety degree elbow and extends a short distance radially away from the center of the lid 20. A siphon tube 22 connects at one end to the top of the spout 18, and connects at the other end to a fitting 24. The fitting 24 mounts in, and penetrates a short distance through, the top of a coffee container 26, where a downward directed spray head 28 attaches to the lower threaded portion of the fitting 24. The bottom of the fitting 24 is positioned at a level that is lower than that of the bottom of the spout 18 in the supplemental reservoir 12, thereby creating a siphon between the spout 18 and the fitting 24 directed from the supplemental reservoir 12 to the container 26. A perforated filter basket 29 is located below the spray head 28 in the container 26, and positioned to capture all of the fluid flow for filtration. A desired amount of coffee grounds 30 rest in a filter 31 above the perforations in the filter basket 29.

A combination valve 32 is also mounted in the lid 20 of the supplemental reservoir 12. The combination valve 32 constitutes a float valve 34 and a pressure relief valve 36. The inlet end of the float valve 34 opens into the supplemental reservoir 12 through the lid 20, while the outlet end exits into a drain tube 38 directed toward the container 26. The float valve 34 (FIG. 3) has a ball float 40, a neck 42 through which air flows between the supplemental reservoir 12 and the drain tube 38, and a seat 44 about the lower rim of the neck 42 that is shaped to accommodate the ball float 40. A ball retainer 46 is attached to the inlet end of the float valve 34, such that the ball float 40 cannot escape the float valve 34 but is free to translate vertically in the neck 42 within the tolerances required for the float valve 34 to function properly. An opening 47 in the retainer 46 allows water to access the ball 46.

Figure 4:
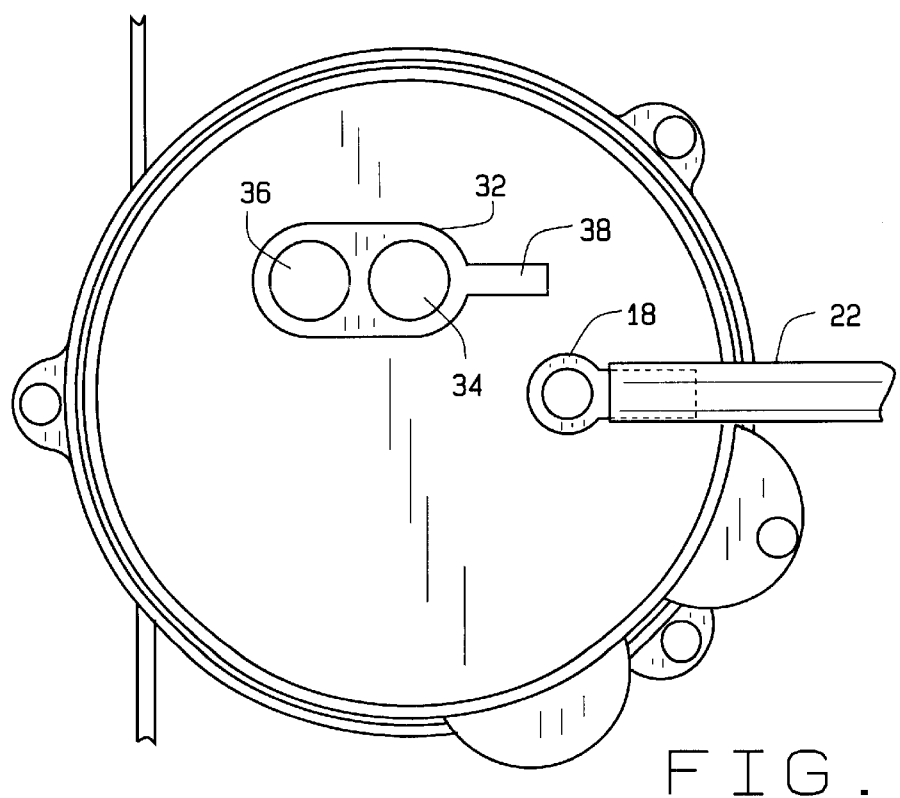
FIG. 4 is an expanded view of the left-hand portion of FIG. 2, to allow for closer examination of the details of the preferred embodiment.

The pressure relief valve 36 in the combination valve 32 provides an exit point for excess pressure in the supplemental reservoir 12 (FIGS. 3 and 4). At one end, the pressure release valve 36 exits into the drain tube 38. At the other end, a ball 48 translates vertically within a neck 50 of the relief valve 36. The ball 48 seals against a valve seat 52 at the base of the neck 50 where the relief valve 36 opens into the supplemental reservoir 12. The ball is held against the seat 52 by a spring 54. The spring is sized to hold the ball 48 tightly against the seat 52 until pressure in the supplemental reservoir 12 exceeds a desired level. When the pressure in the supplemental reservoir 12 overcomes the force of the spring 54, the ball 48 is forced away from the seat 52, and fluid and/or vapor escapes around the ball 48, through the neck 50, and out the drain tube 38. The drain tube 38 can be connected to a waste receptacle or can be connected to the top of the fitting 24 to direct the overflow into the container 26.

When the present invention is ready to operate, heated water is placed in both the primary reservoir 10 and supplemental reservoir 12 up to a level 56 in the supplemental reservoir 12 between the top of the circulation tube 14 and the bottom of the spout 18. The amount of water added during a brewing cycle is normally an amount to at least fill the container 26 below the filter basket 29, or, alternatively, to at least fill a beverage beaker placed below the filter basket 29. The hotter water naturally rises into the supplemental reservoir 12. In this state, the primary reservoir 10, the circulation tube 14 and the outlet tube 16 are all completely filled with the heated water, the ball valve 34 is open, and the pressure valve 36 is closed.

During operation of the invention, hot water is forced into lower portion of the primary reservoir 10. This forces more water into the supplemental reservoir 12 and causes the water level 56 to rise. Convection currents in the water cause the hotter water to rise up into the supplemental reservoir 12 through the circulation tube 14 while cooler water exits through the outlet tube 16, creating a continuous circulation between the two reservoirs 10 and 12. This convection flow system maintains a high water temperature in the supplemental reservoir 12 at all times.

As the level 56 in the supplemental reservoir 12 rises, it overcomes causes the ball float 40 to rise in the neck 42 to the seat 44 to close the float valve 34. Simultaneously, the water enters through the bottom of the spout 18. After the float valve 34 closes, pressure begins to rise in the supplemental reservoir 12. This pressure forces the hot water to rise above the level of the lid 20 to overflow and exit the supplemental reservoir 12 through the spout 18.

The hot water then travels through the siphon tube 22 (FIG. 1) to the fitting 24, where it is directed downward through the spray head 28. The water is then sprayed over the coffee grounds 30 atop the filter 31 in the filter basket 29 to produce coffee. The coffee then drains into the container 26 through the perforations in the filter basket 29.

When nearly all the desired amount of hot water has been directed into the container 26, flow of hot water into the primary reservoir 10 is stopped. Thereafter, the remaining pressure in the supplemental reservoir 12 continues to force hot water through the spout 18 into the container 26 until the water level 56 drops enough to open the float valve 34. When the float valve 34 opens, the supplemental reservoir 12 rapidly stabilizes at atmospheric pressure. At this point, the siphon action of the spout 18, siphon tube 22 and fitting 24 takes over and continues to pull hot water out of the supplemental reservoir 12 until the level 56 drops below the bottom of the spout 18 and the siphon is broken. As the water level 56 continues to recede during the siphon process, the ball 40 of the float valve 34 will continue to drop in the neck 42 until it ultimately returns to rest in the retainer 46.

Should some stoppage occur in the hot water flow during operation, such as if the spray head 28 were to clog, the pressure in the supplemental reservoir 12 could rise to unsafe or otherwise undesirable levels were it not for the presence of the relief valve 36. When the pressure in the supplemental reservoir 12 exceeds a predetermined limit, the pressure within the supplemental reservoir 12 will exceed the strength of the spring 54 and force the ball 48 to rise from the seat 52 and discharge the excessive pressure through the relief valve 36.

Figure 5:
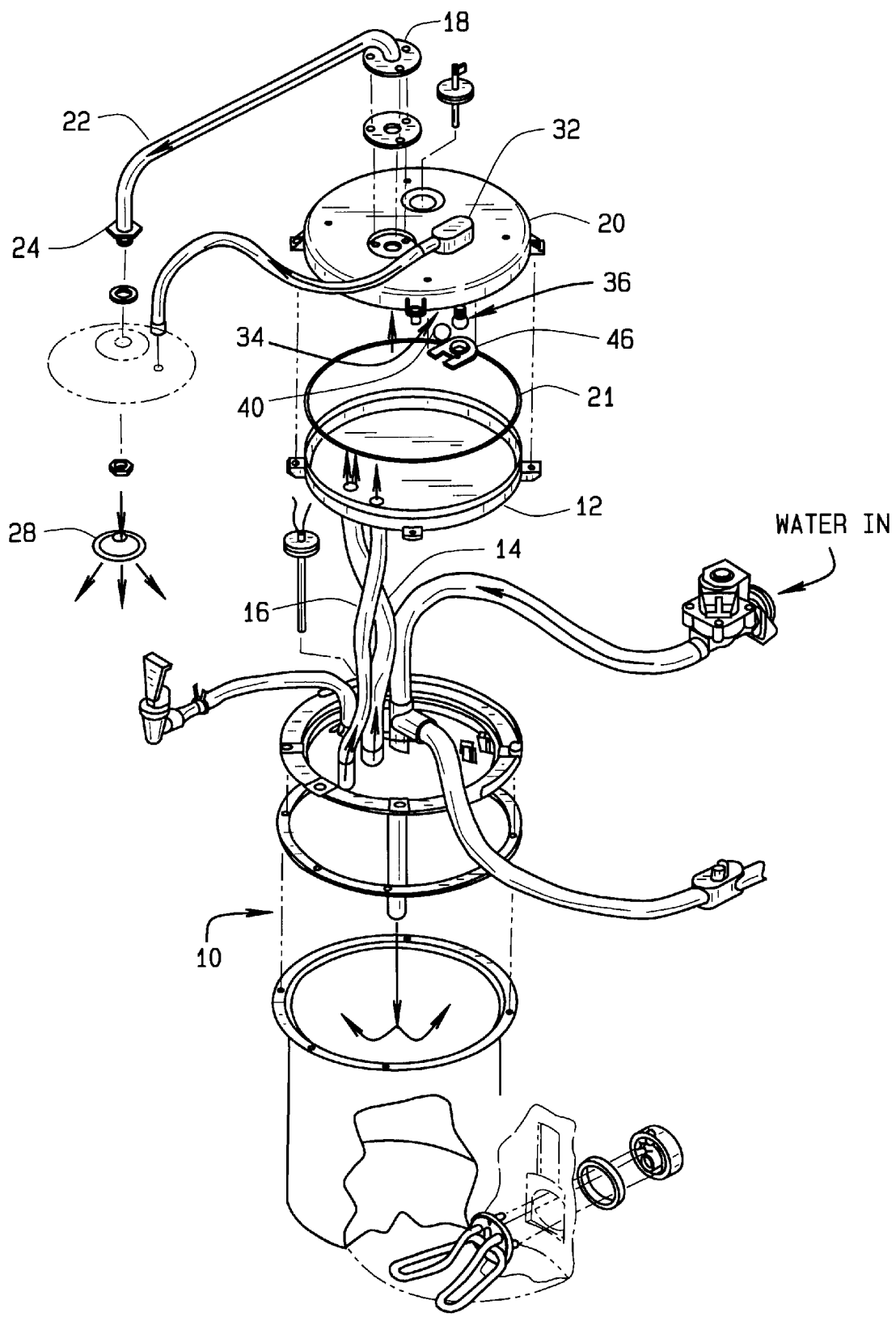
FIG. 5 is an exploded view of a modified embodiment of the present invention.

FIG. 5 presents an exploded view of a modified embodiment. This figure enables one skilled in the art to further conceptualize the complete brewing system as well as the benefits gained from the present invention in, for example, the thin supplemental reservoir 12 that allows the reservoir 12 to be placed in locations with minimal headspace.

It is common in the coffee brewer industry to incorporate a thermostatic controller in the primary reservoir to control the temperature of the water for operation of the brewer. However, an additional thermostatic controller and supplemental heater can also be incorporated into the supplemental reservoir 12 in the present invention. In this way, the temperature of the water closer to the coffee grounds can be more accurately regulated than in a conventional brewer.

An alternate embodiment of the invention combines the lower and supplemental reservoirs 10 and 12, and eliminates the circulation tube 14 and the exist tube 16. In this configuration, the invention operates generally the same as the preferred embodiment, except that the previously described circulation currents in the water, imparted due to the configuration of the circulation tube 14 and the exist tube 16, are not present.

Additional variations on the basic construction are also available. For example, the primary reservoir 10 may be place in some remote location away from the supplemental reservoir 12. The lid 20 may be attached to the supplemental reservoir 12 by a number of common mechanisms, such as a hinge, a slide, or by threaded grooves. The lid may be sealed atop the supplemental reservoir 12 in a number of ways, such as with one or more gaskets, two or more O-rings, or other common methods. Various configurations of float valves and pressure relief valves can be utilized in addition to the designs indicated in the preferred embodiment, so long as the valves provide the same functionality in the brewer. The fitting 24 can be configured in many ways so long as it can mount to the top of the container 26, and is capable of connecting to the siphon hose 22 and the spray head 28. As a unit, the fitting 24, the spray head 28 and the filter basket 29 can be positioned in different locations near the top of the container 26. Gaskets, O-rings, washers and other such devices may be placed between various components in the invention to enhance sealing and tightening characteristics.

As various changes could be made in the above constructions without departing from the scope of the invention, it is intended that all matter contained in the above description or shown in the accompanying drawings shall be interpreted as illustrative and not in a limiting sense.

Catalogue of Elements

10 Primary Reservoir
12 Supplemental Reservoir
14 Circulation Tube
16 Outlet Tube
18 Spout
20 Lid
21 O-ring
22 Siphon Tube
24 Fitting
26 Coffee Container
28 Spray Head
29 Filter Basket
30 Coffee Grounds
31 Filter
32 Combination Valve
34 Float Valve
36 Pressure Relief Valve
38 Drain Tube
40 Float Ball
42 Neck
44 Float Seat
46 Ball Retainer
47 Opening
48 Ball
50 Neck
52 Seat
54 Spring
56 Water Level

What is claimed is:

1. A brewing system comprising a sealed primary fluid reservoir, a brewing and storage container, and a siphon mechanism attached between them, wherein the end of the siphon mechanism attached to the primary reservoir is at a higher level than the end attached to the container, such that the siphon mechanism controllably directs the fluid from the primary reservoir to the container for brewing and storage when sufficient fluid is added to the primary reservoir to rise above the level of the siphon end in the reservoir, a sealed supplemental reservoir, between the primary reservoir and the siphon mechanism, the supplemental reservoir is at a higher level than the primary reservoir and the pressure between both reservoirs is interrelated to enable the control of the cycling of fluids from the primary reservoir to the supplemental reservoir and into the container, such that the supplemental reservoir can function with a minimum of head room, the siphon mechanism including a siphon tube, the siphon tube connecting between the supplemental reservoir and the brewing and storage container, the siphon tube opening directly into the supplemental reservoir at a higher level than the primary reservoir and the brewing and storage container.

2. The brewing system according to claim 1, and further comprising two or more tubes located between the primary and supplemental reservoirs wherein one of the tubes extends further into the reservoirs than the other tubes such that the warmer fluid in the reservoirs circulates by convection into the supplemental reservoir while cooler fluid returns to the primary reservoir.

3. A brewing system comprising a sealed primary fluid reservoir, a brewing and storage container, and a siphon mechanism attached between them, wherein the end of the siphon mechanism attached to the primary reservoir is at a higher level than the end attached to the container, such that the siphon mechanism controllably directs the fluid from the primary reservoir to the container for brewing and storage when sufficient fluid is added to the primary reservoir to rise above the level of the siphon end in the reservoir, a sealed supplemental reservoir between the primary reservoir and the siphon, wherein the supplemental reservoir is at a higher level than the primary reservoir and the pressure between both reservoirs is interrelated to enable the control of the cycling of fluids from the primary reservoir to the supplemental reservoir and into the container, such that the supplemental reservoir can function with a minimum of head room, a float valve and a pressure relief valve at the top of the supplemental reservoir that regulate the pressure within both reservoirs.

4. A brewing system comprising a sealed primary fluid reservoir, a brewing and storage container, and a siphon mechanism attached between them, wherein the end of the siphon mechanism attached to the primary reservoir is at a higher level than the end attached to the container, such that the siphon mechanism controllably directs the fluid from the primary reservoir to the container for brewing and storage when sufficient fluid is added to the primary reservoir to rise above the level of the siphon end in the reservoir, a sealed supplemental reservoir between the primary reservoir and the siphon mechanism, a thermostat and a fluid flow controller, wherein the thermostat is located in the supplemental reservoir and connected to the controller to regulate the temperature in the supplemental reservoir.

\* \* \* \* \*